United States Patent

[11] 3,607,982

[72] Inventors Deloss E. Winkler
Orinda;
Alfred W. Shaw, Moraga, both of Calif.
[21] Appl. No. 47,124
[22] Filed June 17, 1970
[45] Patented Sept. 21, 1971
[73] Assignee Shell Oil Company
New York, N.Y.

[54] HYDROXYLATED BLOCK COPOLYMERS OF BUTADIENE AND ISOPRENE
4 Claims, No Drawings
[52] U.S. Cl. .................................................. 260/880,
260/94.7 A, 260/836, 260/879
[51] Int. Cl. ............................................... C08f 15/00,
C08f 19/00
[50] Field of Search ........................................ 260/879,
880 B

[56] References Cited
UNITED STATES PATENTS
| | | | |
|---|---|---|---|
| 2,829,135 | 4/1958 | Greenspan ................. | 260/94.7 |
| 3,322,852 | 5/1967 | Trementozzi ............... | 260/837 |
| 3,322,853 | 5/1967 | Trementozzi ............... | 260/837 |
| 3,465,063 | 9/1969 | Hassell ....................... | 260/876 |
| 3,488,394 | 1/1970 | Cummins .................... | 260/94.7 |
| 3,555,112 | 1/1971 | Winkler ...................... | 260/836 |

*Primary Examiner*—Paul Lieberman
*Attorneys*—William H. Myers and Martin S. Baer ABSTRACT: Novel epoxidized block copolymers and novel hydroxylated products derived from them are prepared by epoxidation, and then hydrolysis, of conjugated diene block copolymers. In the selectively epoxidized polymers at least one highly (80–100 percent) epoxidized polymer block A, formed from a branched chain conjugated diene, is attached to at least one polymer block B, formed from a straight chain conjugated diene that is less than about 50 percent epoxidized. Hydroxylated products are prepared by acid hydrolysis of the epoxidized copolymers.

HYDROXYLATED BLOCK COPOLYMERS OF BUTADIENE AND ISOPRENE

BACKGROUND OF THE INVENTION

Rubbers and elastomers of either natural or synthetic origin normally require chemical vulcanization to produce useful elastic properties. Before vulcanization, rubbers have tacky properties and low strength which makes them of little utility except as rubber cements.

In recent years, a special class of copolymers has been developed that are generically referred to as block copolymers. Of these, the important group is the one having the properties of so-called "self-vulcanizing" or "self-curing" elastomers. This term refers to a particular type of block copolymer having the stress-strain characteristics of vulcanized rubbers, but without the need for chemical curing. A class of thermoplastic elastomers has been developed having the general configuration $A-(B-A)_n$ wherein $n$ is a relatively small integer in the order of 1–8. In these block copolymers the polymer blocks A are generally monovinyl-arene polymer blocks typified by polystyrene, and the B blocks are polymer blocks of a conjugated diene or elastomeric copolymer blocks of random styrene-conjugated diene. Typical of these are the block copolymers having the general configuration polystyrene-polyisoprene-polystyrene wherein the ratio of average molecular weights is such that the self-curing properties are readily apparent. These products are particularly useful for the preparation of adhesives, coatings, elastic threads, films, and for other purposes where chemical vulcanization is either awkward, undesirable or expensive.

While these copolymers have unique properties insofar as their exhibition of the properties of a vulcanized rubber without actually being subjected to vulcanization, they have certain physical properties that it would be desirable to improve. For example, their hydrocarbon sensitivity limits their fields of utility. Moreover, it would be desirable to provide block copolymers that have polar groups, such as polymers that are epoxidized or hydroxylated to a certain extent, since such polymers would be permeable by water to some degree, but at the same time would retain a substantial amount of their original tensile strength in the presence of water or other hydrogen bonding solvents. Such copolymers would also be more resistant to nonpolar solvents.

Other block copolymers have been prepared wherein each of the polymer blocks is made primarily from certain dienes. These copolymers, however, do not have the self-curing properties of the class described above. It appears to be necessary that the terminal polymer blocks have the general properties of thermoplastics rather than of elastomers in order to impart self-curing properties to block copolymers. Thus, the block copolymers produced from dienes as the only monomers are weak, somewhat tacky products that flow like unvulcanized rubber. Improper choice of block identity thus can lead to polymers of which all of the structural elements flow under stress.

Numerous derivatives have been made of the usual hydrocarbon rubbers (not block copolymers) including both epoxides and hydroxides. One of the convenient routes is to hydrolyze the epoxide produced by peroxidation of conjugated diene polymers. Also, hydroxylated diene polymers may be prepared directly by other chemical means.

Usually, hydroxylation of rubbers yields products of some chemical interest but of little commercial utility. As an example, superficial hydroxylation of such rubbers yields products that are mildly polar but with little change in properties other than a possible increase in resistance to hydrocarbon solvents, and these compounds still require chemical vulcanization to achieve satisfactory strength. On the other hand, if higher hydroxylation levels of either conjugated diene homopolymers or of random styrene-butadiene copolymers are achieved, the products have been highly brittle, resinous substances having virtually no elastic properties. Thus, hydroxylated elastomeric polymers that are self-curing, do not require vulcanization and have improved solvent resistance are not known to the art.

OBJECTS OF THE INVENTION

It is an object of the present invention to provide improved block copolymers. It is another object of this invention to provide block copolymers having self-curing properties. It is a particular object of this invention to provide selectively epoxidized as well as selectively hydroxylated block copolymers. Other objects will become apparent during the following detailed description of the invention.

STATEMENT OF THE INVENTION

Now, in accordance with this invention, improved self-curing block copolymers are provided that comprise selectively epoxidized or hydroxylated block copolymers. The copolymer, prior to epoxidation and subsequent hydroxylation, has the general configuration

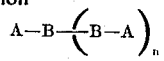

where $n$ stands for an integer between zero and eight, and wherein each A is a polymer block of one of certain branched chain conjugated dienes having five to eight carbon atoms per molecule and each B (including adjacent B blocks, e.g. -B-B, which will be regarded as a single B block) is a polymer block of an unbranched (straight chain) conjugated diene having four to six carbon atoms per molecule. In the copolymers of this invention a high proportion (80—100 percent) of the unsaturated linkages of the A blocks have been epoxidized and hydroxylated by hydrolysis, while epoxidation and hydroxylation of the B blocks has been limited to 0–50 percent. When selective hydroxylation has been conducted according to this invention, many properties of the untreated original polymer, which has the general properties of a typical uncured diene rubber, are substantially improved, including much higher tensile strengths, much lower permanent set after stress, improved solvent resistance and, in some compositions, improved water sensitivity which is of value in certain applications.

The epoxidized intermediate polymers are also an important and necessary part of this invention, because it is in the epoxidation step that the selectivity of installation of oxygen substituents is maintained. The intermediate epoxy rings are opened by hydrolysis to produce the hydroxylated polymer.

The high strength and improved solvent resistance of these hydroxylated block copolymers, compared to the unreacted original block copolymer composed of several diene blocks, is dependent on a high degree of hydroxylation in the terminal blocks. On the other hand, retention of good elastomeric properties, while at the same time retaining improved solvent resistance in the final block copolymer, requires limiting hydroxylation in the middle block. The hydroxylation of the terminal A blocks might be regarded as an alternative to vulcanizing since, while the hydroxylated block copolymer is thermoplastic and can be repeatedly molded, melted and remolded, it returns each time it is cooled to a solid mass having the properties of a vulcanized system. This behavior is not characteristic of a chemically cured system and indicates that other special mechanisms are operating in the hydroxylated block copolymers of this invention to provide the improved properties.

Hydroxylation of the middle block of the subject polymers must be limited to avoid loss of elastomeric properties. Epoxidation and hydroxylation of a polybutadiene homopolymer, where no polymer blocks are present, will change it to a hard, resinous plasticlike material if more than about 50 percent of the olefinic bonds are reacted. A large number of hydroxyl substituents in a polymer chain confer water-sensitivity, adequate strength and improved hydrocarbon solvent resistance, but such polymers are poor elastomers. The middle blocks of the polymers of this invention perform the elastomeric function and are subject to much the same limitations on hydroxyl content as a diene homopolymer.

It is evident that a range of elastomeric properties can be obtained in the copolymers of the present invention by critically limiting the hydroxyl content of the middle block while causing the end blocks to be substantially completely hydroxylated. As the percentage of the molecule that is middle block decreases, the character of the hydroxylated block copolymer changes, since the relative proportion of plastic-type to elastomeric-type blocks changes. The extent of hydroxylation required to achieve certain improvements in properties, compared to the unsubstituted polymer, also changes. Thus, control of a number of variables is required to make products of optimum properties, but also a variety of products can be made by selecting among several dienes, their relative proportions, the molecular weight of the two kind of blocks and the extent of epoxidation and hydrolysis.

Still in accordance with the present invention, a process is provided for the preparation of such selectively hydroxylated block copolymers which comprises subjecting a solution of the original polymeric diene block copolymer in an essentially inert hydrocarbon to epoxidation at temperature between 0° C. and 75° C., preferably between about 20° C. and about 45° C., neutralizing the excess acid with a basic substance, then treating the intermediate polymer in solution with water containing a strong e.g. mineral acid, at about 20° C. to 125° C., preferably at temperatures between about 30° C. and 80° C. In order to provide selectivity in the epoxidation step, which in turn controls selectivity in the location of the hydroxyl substituents after hydrolysis, the relative quantities of polymer and epoxidizing reagents, as well as reaction variables of time, temperature and concentration must be carefully adjusted.

The block copolymers utilized in the preparation of the epoxidized and hydroxylated derivatives have the general configuration $A-B-(BA)_n$ where the symbol $n$ stands for a whole integer between 0 and 8. Each A block is an independently selected polymer block of certain branched chain dienes having 5 to 8 carbon atoms per molecule, the average molecular weight of each A block being between about 3,000 and about 40,000, and each B block, including adjacent B blocks, e.g. B-B, which will be regarded as a single B block, is a polymer block of a straight chain conjugated diene having 4 to 6 carbon atoms per molecule, the average molecular weight of the B blocks being between about 35,000 and about 150,000 (preferably 50,000 to 125,000). It is necessary that the weight of the A blocks be less than about 55 percent, preferably less than 40 percent, of the total weight of the block copolymer in order to achieve good elastomeric properties.

The branched conjugated diene molecules from which blocks A are prepared contain an alkyl radical attached to at least one of the interior doubly bonded carbon atoms. Examples are 2-methylbutadiene (isoprene), 2-ethyl butadiene, 2,3-dimethylbutadiene, and the like. Butadiene and pentadiene are examples of diene monomers suitable for block B. Isoprene is preferred for the formation of the A blocks of the copolymer while butadiene is preferred for block B. However, other pairs of diene monomers will produce satisfactory epoxidized and hydroxylated products provided they form an all-diene block copolymer in which there is a sizeable difference in rate of epoxidation between the A blocks and the B block, so that the selectivity in installation of epoxy, and later hydroxyl groups, is preserved.

The more highly substituted the carbon atoms of a double bond are, the faster they react with peracetic acid to form epoxides. Block copolymers made from, for example dimethylbutadiene in the end blocks and butadiene in the middle block are especially suitable for this invention, because of the large disparity in reaction rates with peracetic acid between the two types of blocks. Selectivity in installing epoxide groups depends to a major extent on this difference in reaction rates between the substituted and unsubstituted diene polymer blocks. Epoxidizing reaction conditions may be selected, so that, for example, 25 percent (of theory) of all of the olefinic bonds in the block copolymer will be attacked. The fact that the double bonds bearing alkyl substituents on one of their carbons react much faster than double bonds with only hydrogen atoms attached will cause a high degree of epoxidation in the end block and a low degree of epoxidation in the middle block by the time the epoxidizing reagent is consumed.

The block polymers used for the preparation of the epoxidized and hydroxylated products of this invention may be prepared by sequential or coupling processes. Thus, the polymers may be made by a sequential process in which the monomers are injected incrementally. The first terminal diene polymer block is formed, then a conjugated diene monomer is injected to form the second polymer block and a third diene monomer (or the same diene monomer used in preparing the first polymer block) is then added to form the second terminal polymer block. Care must be taken that each monomer is substantially consumed, or any excess is removed, before the next monomer is added. Alternatively, coupling procedures may be used wherein a polymer block of a branched chain conjugated diene and an attached polymer block of a second conjugated diene terminated with a lithium radical are joined using a coupling agent such as a dihalohydrocarbon. Coupled and branched products are considered to be within the scope of the present invention.

Multibranched block copolymers have been formed by reacting, for example, a two-block copolymer having an active terminal lithium radical with 0.5–1.5 equivalents per equivalent of lithium of a monohydric alcohol ester of a dicarboxylic acid. Products of this class have been found to be mixtures of dimer, trimer and tetramer of the initial polymer; the extent of each has not been determined. Operable diesters for such reaction are those in which the carbonyl radicals of the acid are attached directly to carbon atoms without an intervening oxygen atom, although oxygen, nitrogen or sulfur atoms may appear elsewhere in the carbon chain. Multibranched block polymers have also been made by reacting a two-block copolymer having an active terminal lithium radical with compounds of metals, such as silicon tetrachloride, silicon tetrabromide and the like, as well as with organic compounds of silicon and other metals. In these products the branches radiate from the central metal atom.

Polyfunctional catalysts, such as dilithiostilbene and the like, may also be used to form suitable block copolymers. In using such catalysts to make products suitable for the practice of this invention the middle polymer block is formed first from an unbranched chain diene, each terminal radical of the block being a lithium radical. A second, branched chain diene is then injected to form the end blocks of the desired three-block copolymer having the required A-B-A structure.

While these three-block copolymers are especially contemplated, it is possible to form suitable and corresponding block copolymers having the general configuration $A-B-(BA)_n$ wherein $n$ is an integer between one and eight. These products may be obtained by coupling procedures or by sequential block polymerization. Moreover, branched block copolymers may be utilized in which the polymer comprises a number of nonlinear segments which may be either cruciform block polymers, star-shaped block polymers or graft block polymers, as long as the proportion of branched chain diene end blocks to straight chain diene interior blocks is within the generic scope as expressed hereinbefore.

Also, inclusion of minor amounts of other monomers during polymerization of any of the conjugated diene blocks to enhance or diminish the reactivity of such blocks to later epoxidation or hydroxylation is within the scope of this invention. Monomeric styrene for example may, if desired, be included with the conjugated dienic monomer used to prepare the elastic polymeric middle block to decrease susceptibility of the block to epoxidation, thereby preserving the elastomeric nature of such block.

The block copolymers, from which the epoxidized and hydroxylated products are derived, are made substantially entirely from dienes, and accordingly have properties resembling unvulcanized rubber, i.e. they normally require vulcanization to achieve the desirable properties of a commercial product. The selective epoxidation and hydroxylation applied to these unvulcanized block copolymers replaces the vulcanizaton requirement and produces processing benefits which cannot be secured when vulcanization is required in similar products.

The molecular weight limits specified above for each of the polymeric blocks A and B respectively are chosen in order to yield self-curing elastomeric products, following epoxidation and hydroxylation, having a maximum combination of desired physical properties.

Epoxidized and hydroxylated block copolymers having only two blocks, such as an epoxidized and hydroxylated polyisoprene-polybutadiene two-block copolymer, are within the scope of this invention. While the two-block products do not have all of the improved properties of the three-block or multiblock polymers, they have promise as viscosity control additives.

The present invention is based upon the discovery of the limitations imposed on the types of monomers from which suitable block copolymers may be prepared, the critically defined average molecular weights of the several blocks, and the relationship of molecular weights of the end blocks to the molecular weight of the middle block, as well as the extent of epoxidation and hydroxylation of the polymer blocks required to impart the self-curing properties desired. In essence, the objective of selective epoxidation and hydroxylation of the terminal blocks is to convert these blocks to hydroxyl derivatives that have properties like a thermoplastic resin while restricting the number of hydroxyl groups in the middle block to retain its elastomeric nature so that elastomeric requirements of the final derivative product are fulfilled. Mechanistic restrictions on flow under stress that are characteristic of thermoplastics, such as intra- and inter-molecular hydrogen bonding and very mild crystallinity, may be operating in the subject hydroxylated block copolymers to add to the restrictions on viscous flow that are usual in the two-phase hydrocarbon block polymers and to produce the good tensile strength of the hydroxylated polymers.

Within the broad area of possibility of ratios of the two types of conjugated dienes in their specified block positions, experts in the rubber art will realize that a variety of products may be obtained. The problem was to determine the molecular weight range and degree of hydroxylation required in which a group of compositions exists that combine an optimum number of desirable physical properties. In this case the desirable properties are those of a thermoplastic rubber which does not require vulcanization and which can be readily shaped by forming operations commonly employed for thermoplastics. This is of special economic advantage as compared with the use of elastomers which required vulcanization. In the ordinary course of processing the latter type of rubbers, it is necessary to discard or merely use as scrap a substantial part of the product which has been vulcanized during or prior to processing such as in molding and like. Vulcanizing results in improved elastomeric properties but at the same time yields a rubber which cannot be reworked except as ground up scrap, which is used as a mere extender for other rubbers.

Such limitations are imposed by the end uses and processing equipment involved in the preparation of useful articles of this type. One limitation is low tensile strength, which results if the terminal polymer blocks A before epoxidation have too low a molecular weight, for example, 1,000–2,000, causing low tensile strength of the resulting block copolymer even after hydroxylation. On the other hand, if the average molecular weight of the terminal polymer blocks A is excessively high, for example, 100,000, only rigid resins of low extensibility are obtained after hydroxylation. Even when this average molecular weight is reduced somewhat but still outside the recited ranges, after hydroxylation the resulting block copolymers are stiff elastomers. Finally, the average molecular weight of the elastomeric middle block B (or the B-B block in the

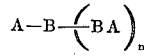

species) is limited by the finding that if its average molecular weight is excessive, then an area of poor processability is entered making it difficult to process and handle, as well as to mold or otherwise to convert the hydroxylated products.

In the present invention, the subject block copolymers are selectively epoxidized and hydroxylated to convert the terminal polymer blocks to polyhydroxylated blocks resembling thermoplastic resins while leaving the interior blocks elastomeric. Not only is this objective achieved, but the resulting selectively hydroxylated products have substantially improved resistance to swelling and solution in various solvents, particularly hydrocarbons, than is found either with the parent all-diene block copolymers or with the corresponding self-curing block copolymers of which the type polystyrene-polybutadiene-polystyrene is typical.

In the preferred process for the preparation of the derivatized block copolymers of this invention, the block copolymer is first epoxidized to an extent that the more reactive, terminal blocks are epoxidized to a high degree, i.e. 80–100 percent, and the less reactive middle block is at most only partially attacked. By adjustment of the extent of epoxidation of the two kinds of blocks, the solvent resistance, modulus and tensile set properties of the derived hydroxylated product can be controlled. If more than about 50 percent of the residual olefinic bonds in the middle block are reacted, the elastomeric quality of the hydroxylated block copolymer is substantially affected, and the products are much more sluggish rubbers and have characteristics more like plastics.

Epoxidation may be effected by the use of epoxidizing agents, such as with a peracid, exemplified by peracetic acid, or with hydrogen peroxide in the presence of acetic acid and sulfuric acid, or with hydrogen peroxide in the presence of a low molecular weight fatty acid such as formic acid. Relatively low temperatures are employed, in the order of 20–45° C., and reaction times of about ¼ to about 4 hours are usually sufficient to produce the controlled epoxidation desired in the subject block copolymer.

The epoxidized intermediate polymers produced by this step are interesting block copolymers and have potential commercial utility due to their reactive epoxy (oxirane) substituents. The epoxidized copolymers function as stabilizers in other polymers, or can be subjected to various chemical reactions, such as hydrogenation, hydrohalogenation, coupling to a lithium terminated block polymer, reaction with difunctional agents to cause cross-linking, or reaction with phosphorus halides to yield fire-resistant polymers.

The epoxidation reaction is followed by a hydrolysis step to convert a high proportion of the epoxide (oxirane) rings to the corresponding glycols. It is preferred that at least about 80 percent of the epoxide rings be opened. The epoxidized block copolymer may be readily hydrolyzed by moderate heating in the presence of water and a small amount of a strong mineral acid. The presence of certain low molecular weight alcohols expedites the hydrolysis. Temperatures in the order of 25–75° C. and reaction times of ¼ to 8 hours are usually sufficient for the hydrolysis step. The products of this hydrolysis procedure are rarely, if ever, "pure" hydroxyl derivatives. Analytical procedures indicate that many ether rings still remain, but the rings are not three-membered epoxide rings, and that side reactions occur that are as yet of undetermined nature. However, most of the epoxy rings are converted to glycols wherein the hydroxyl groups are located on adjacent carbon atoms, i.e. they have the

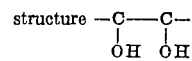

The presence of hydroxyl substituents along the chains of the hydroxylated block copolymers of this invention permits them to absorb hydroxyl-containing solvents, such as water or low molecular weight alcohols. When the extent of polymer hydroxylation is very high, considerable solvent is imbibed and the polymer loses strength, but careful control of hydroxylation yields products suitable for the function of semipermeable membranes in such uses as water purification, and also may serve in compositions utilized for human body implants, and may be major components of adhesives because of their ability to form hydrogen bonds with glass and metals.

The following working examples illustrate the preparation and properties of the epoxidized and hydroxylated block copolymers of this invention:

EXAMPLE I

The block copolymer utilized in a typical epoxidation had the general structure polyisoprene-polybutadiene-polyisoprene, the average block molecular weights being 21,000–84,000–20,000, and the polyisoprene blocks were 33 percent weight of the total weight of the starting block copolymer.

Epoxidation

To 155 g. of this block copolymer dissolved in 3,500 g. of benzene at 30–35° C. was added with stirring during 30 minutes 100 g. of 10 percent weight of peracetic acid, then 118 g. of 40 percent weight of peracetic acid that contained 6.8 g. of sodium acetate to neutralize strong acid stabilizer. Stirring was continued and the temperature was held to 30–35° C. for an additional 3 hours, then 355 g. of sodium carbonate was added carefully to neutralize the acid and stirring was continued for another ½ hour. The slurry was filtered. The filtrate was passed over a bed of activated alumina to remove the last traces of acid and peroxide. The epoxidized product can be recovered from solution by water coagulation or by precipitation with acetone. However, the subsequent hydrolysis step was ordinarily conducted on the filtered polymer solution from epoxidation without recovering dry polymer. The epoxidized polymer produced in this experiment contained 7.1 percent % oxygen, which corresponded to about 33 percent epoxidation of all of the olefin linkages in the polymer. The polyisoprene blocks react fast enough so that they were assumed to be substantially completely epoxidized. Since the polyisoprene block was about 33 percent weight of the polymer, relatively few of the double bonds in the polybutadiene block were attacked before the peracid was consumed. Epoxide content of the polymer can also be determined by titration with HBr-acetic acid reagent.

Hydrolysis of Epoxidized Polymer

In a typical hydrolysis, a bottle was charged with 480 g. of a 4 percent weight solution of epoxidized block copolymer, 240 ml. of a solution containing 98 g. of water, 2 ml. of 70 percent weight perchloric acid, and 400 ml. of isopropyl alcohol. The bottle was sealed, then tumbled end over end in a water bath at 50° C. for 6 hours. The resulting mixture was neutralized with 15 ml. of 1.0 N NaOH solution, followed by tumbling for another 30 minutes. The hydrolyzed block copolymer was recovered by hot water coagulation, then dried briefly on a rubber mill and completely dried in a vacuum oven.

Rate of hydrolysis was followed by performing oxygen analyses and by the infrared absorbance ratio $A_{2.9\mu(OH)}/A_{7.25\mu(CH_3)}$ of cast films made from polymer samples. Hydrolysis using the above conditions was complete in about four hours. The hydroxylated product from this block copolymer had an oxygen content of 10.5 percent weight; if all of the epoxy groups in the polymer were hydrolyzed to vicinal hydroxy groups, the polymer should contain 10.7 percent weight oxygen. Hydroxyl content can also be determined, but less accurately, by titration with esterifying reagents.

Prior to epoxidation the block copolymer had the poor tensile properties of an unvulcanized diene rubber and was too weak to be handled in typical tensile strength testing. The epoxidized product was also weak, but its rubbery character was evident during handling. The hydroxylated product from the preparation described above was a strong elastomer. When molded as a thermoplastic for 10 minutes at 180° and tested by rubber testing techniques, it had the following properties:

| | |
|---|---|
| Tensile strength at break, 23° C., p.s.i. | 4,000 |
| 300% modulus, 23° C., p.s.i. | 375 |
| Elongation at break, 23° C., % | 900 |
| Set after break, 23° C., % | 25 |

When immersed in ASTM Number 3 Oil or ASTM Fuel A for 3 days at 25° C., the weights of samples of this hydroxylated polymer increased 69 percent and 28 percent respectively.

EXAMPLE II

Similar conditions of epoxidation and hydrolysis as in example I were applied to another block polymer having the structure polyisprene-polybutadiene-polyisoprene with average block molecular weights of 9,000–75,000–8,000; the polyisoprene blocks were 18 percent of the total weight. Sufficient peracetic acid was used to epoxidize about 50 percent of the double bonds in the copolymer. Assuming that all of the double bonds in the polyisoprene block reacted, then about 40 percent of the olefinic bonds in the polybutadiene block were epoxidized. After hydrolysis, the oxygen content was 18.6 percent weight.

The hydroxylated product was molded for 10 minutes at 180° C. and samples were tested by rubber testing techniques. The following properties were observed:

| | |
|---|---|
| Tensile strength at break, 23° C., p.s.i. | 4,300 |
| 300% modulus, 23° C., p.s.i. | 2,050 |
| Elongation at break, 23° C., % | 525 |
| Set after break, 23° C., % | 14 |
| Tensile strength, 70° C., p.s.i. | 450 |
| Percent increase in weight when immersed at 25° C. for 3 days in: | |
| ASTM Oil 3 | 1.2 |
| ASTM Fuel A | 0.5 |
| ASTM Fuel B | 22 |
| ASTM Fuel C | 40 |
| Toluene | 116 |
| Carbon Tetrachloxide | 210 |
| Chloroform | Dissolved |
| Methanol | Partly Dissolved |

Under the same conditions, a chloroprene black vulcanizate absorbed 17 percent its weight of ASTM Fuel A, 270 percent of toluene and 500 percent of chloroform. Before epoxidation and hydrolysis the polyisoprene-polybutadiene-polyisoprene block copolymer was completely soluble in hydrocarbon and chlorinated solvents and insoluble in methanol.

EXAMPLE III

A hydroxylated block copolymer was produced, using the epoxidation and hydrolysis steps outlined in example I, from a polyisoprene-polybutadiene-polyisoprene block copolymer having average molecular weights of 4,500–73,000–4,500 and in which the polyisoprene blocks were 11 percent of the total polymer. This block copolymer was treated with sufficient peracetic acid to epoxidize about 50 percent of the double bonds, or to 13 percent weight oxygen content. The oxygen content corresponded to about 44 percent epoxidation in the polybutadiene block and 100 percent in the polyisoprene block. The oxygen content of the hydrolyzed polymer was 19.1 percent.

After molding for 10 minutes at 180° C., samples of the hydroxylated polymer had the following properties, when tested by rubber techniques:

| | |
|---|---|
| Tensile strength at break, 23° C., p.s.i. | 3,250 |
| 300% modulus, 23° C., p.s.i. | 2,325 |
| Elongation at break, 23° C., % | 425 |
| Set after break, 23° C., % | 9 |
| Tensile strength at break, 70° C., p.s.i. | 525 |
| Percent increase in weight when immersed in: | |
| ASTM Oil 3 | 1.0 |
| ASTM Fuel A | 0.1 |
| ASTM Fuel B | 14 |
| ASTM Fuel C | 31 |
| Toluene | 79 |
| Carbon Tetrachloride | 141 |
| Chloroform | Dissolved |
| Methanol | Partly Dissolved |

We claim as our invention:

1. A block copolymer comprising a. at least one branched chain conjugated diene polymer block A, said diene having five to eight carbon atoms per molecule, said block bearing at least about 1.6 hydroxyl substituents per condensed diene monomer unit, block A having an average molecular weight of 3,000 to 40,000, and
b. at least one unbranched conjugated diene polymer block B, said diene having four to six carbon atoms per molecule, said block B having no more than about 0.8 hydroxyl substituents per condensed diene monomer unit, block B having an average molecular weight between about 35,000 and 150,000.

2. An elastomeric block copolymer according to claim 1 having the general configuration $A-B-(B-A)_n$ wherein $n$ is an integer from 0 to 8.

3. A block copolymer according to claim 2 having the general configuration A-B-A wherein the block A monomer is isoprene and the block B monomer is butadiene.

4. A block copolymer according to claim 1 wherein the diene monomers contain minor amounts of monovinyl arene.